United States Patent
Sandrasekaran et al.

(10) Patent No.: US 12,222,006 B2
(45) Date of Patent: Feb. 11, 2025

(54) ROTATIONAL LOCK IN INNER RING OF OUTBOARD BEARING TO AVOID LOCK WASHER

(71) Applicant: Volvo Truck Corporation, Gothenburg (SE)

(72) Inventors: Ramachandran Sandrasekaran, Bangalore (IN); Marcel Palmgren, Torslanda (SE); Kent Augustsson, Bollebygd (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/669,781

(22) Filed: May 21, 2024

(65) Prior Publication Data

US 2024/0301916 A1     Sep. 12, 2024

Related U.S. Application Data

(63) Continuation of application No. 17/792,184, filed as application No. PCT/EP2021/050436 on Jan. 12, 2021, now Pat. No. 12,018,721.

(30) Foreign Application Priority Data

Jan. 27, 2020    (IN) .............................. 202041003644

(51) Int. Cl.
    B60B 27/02      (2006.01)
    B60B 27/00      (2006.01)
    (Continued)

(52) U.S. Cl.
    CPC ........ F16C 33/586 (2013.01); B60B 27/0078 (2013.01); B60B 27/02 (2013.01);
    (Continued)

(58) Field of Classification Search
    CPC .... F16C 19/386; F16C 33/586; F16C 35/063; F16C 35/0635; F16C 2226/12;
    (Continued)

(56) References Cited

U.S. PATENT DOCUMENTS

| | | | |
|---|---|---|---|
| 4,433,877 A * | 2/1984 | Colanzi | ................. F16C 19/186 411/161 |
| 5,322,374 A | 6/1994 | Takata | |

(Continued)

FOREIGN PATENT DOCUMENTS

| | | |
|---|---|---|
| CN | 101649860 A | 2/2010 |
| CN | 204437067 U | 7/2015 |

(Continued)

OTHER PUBLICATIONS

Non-Final Office Action for U.S. Appl. No. 17/792,184, mailed Jan. 24, 2024, 6 pages.

(Continued)

Primary Examiner — Phillip A Johnson
(74) Attorney, Agent, or Firm — Withrow & Terranova, PLLC

(57) ABSTRACT

A wheel end assembly for a vehicle, comprising a central wheel support member such as a spindle or a steering knuckle, and an outboard wheel end bearing arranged concentrically around the central wheel support member. The outboard wheel end bearing comprises roller elements accommodated between an inner race-forming part and an outer race-forming part surrounding the inner race-forming part. The inner race-forming part is configured to be supported by the central wheel support member. The central wheel support member comprises a first rotational lock portion. The inner race-forming part comprises a second rotational lock portion configured to engage with the first rotational lock portion to prevent the inner race-forming part (Continued)

from rotating relative to the central wheel support member. The invention also relates to a vehicle comprising such a wheel end assembly.

10 Claims, 10 Drawing Sheets

(51) Int. Cl.
*B60B 37/10* (2006.01)
*F16C 19/38* (2006.01)
*F16C 33/58* (2006.01)
*F16C 35/06* (2006.01)
*F16C 35/063* (2006.01)

(52) U.S. Cl.
CPC ............ *B60B 37/10* (2013.01); *F16C 19/386* (2013.01); *F16C 33/585* (2013.01); *F16C 35/0635* (2013.01); *F16C 2226/12* (2013.01); *F16C 2226/70* (2013.01); *F16C 2226/76* (2013.01); *F16C 2326/02* (2013.01); *F16C 2326/20* (2013.01)

(58) Field of Classification Search
CPC .............. F16C 2226/70; F16C 2226/76; F16C 2226/78; F16C 2226/80; F16C 2326/02; B60B 27/02; B60B 27/0078; B60B 37/10
See application file for complete search history.

(56) References Cited

U.S. PATENT DOCUMENTS

| | | | |
|---|---|---|---|
| 5,560,687 A | 10/1996 | Hagelthorn | |
| 6,224,167 B1 | 5/2001 | Riley | |
| 7,883,272 B2 | 2/2011 | Kiuchi et al. | |
| 10,107,324 B1 | 10/2018 | Rode | |
| 2004/0234182 A1 | 11/2004 | Tajima et al. | |
| 2008/0089628 A1 | 4/2008 | Kiuchi et al. | |
| 2009/0252551 A1 | 10/2009 | Kamikawa et al. | |
| 2011/0291468 A1 | 12/2011 | Rieger et al. | |
| 2018/0009479 A1 | 1/2018 | Merrill | |
| 2023/0048379 A1 | 2/2023 | Sandrasekaran et al. | |

FOREIGN PATENT DOCUMENTS

| | | |
|---|---|---|
| CN | 107269686 A | 10/2017 |
| CN | 208587390 U | 3/2019 |
| EP | 2921731 A1 | 9/2015 |
| FR | 2620497 A1 | 3/1989 |
| JP | 2001001710 A | 1/2001 |
| JP | 2001158206 A | 6/2001 |
| JP | 2002070881 A | 3/2002 |
| JP | 2009127803 A | 6/2009 |

OTHER PUBLICATIONS

First Office Action for Chinese Patent Application No. 202180010761.3, mailed Jan. 20, 2024, 10 pages.
Extended European Search for European Patent Application No. 23198955.9, mailed Oct. 20, 2023, 5 pages.
International Search Report and Written Opinion for International Patent Application No. PCT/EP2021/050436, mailed Apr. 30, 2021, 47 pages.
International Preliminary Report on Patentability for International Patent Application No. PCT/EP2021/050436, mailed Dec. 7, 2021, 42 pages.

* cited by examiner

ROTATIONAL LOCK IN INNER RING OF OUTBOARD BEARING TO AVOID LOCK WASHER

PRIORITY APPLICATIONS

The present application is a continuation of U.S. patent application Ser. No. 17/792,184, filed on Jul. 12, 2022, now U.S. Pat. No. 12,018,721, which is a 35 U.S.C. § 371 national phase filing of International Application No. PCT/EP2021/050436, filed Jan. 12, 2021, which claims the benefit of Indian Patent Application No. 202041003644, filed Jan. 27, 2020, the disclosures of which are incorporated herein by reference in their entireties. Priority is claimed to each of the aforementioned applications.

TECHNICAL FIELD

The invention relates to a wheel end assembly for a vehicle. The invention also relates to a vehicle comprising such a wheel end assembly.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

The wheels of a vehicle, such as a truck, are normally connected to a respective wheel end hub. In its turn, the wheel end hub may be connected to a rotatable wheel axle, whereby rotation of the wheel axle is conveyed into rotation of the wheels. The wheel end hub is commonly coaxially mounted to a wheel bearing which in turn is coaxially mounted around the wheel axle, typically around a spindle enclosing the wheel axle. For a non-driven wheel the wheel end hub is commonly coaxially mounted to a wheel bearing which in turn is coaxially mounted to a solid steering knuckle. Irrespective of the wheel bearing being mounted to a spindle or a steering knuckle, it has an inner ring and an outer ring between which bearing elements are provided for enabling relative rotation between the inner ring and the outer ring. The wheel end hub is fixedly connected to one of said rings, typically the outer ring, with which it rotates.

A hub nut is usually provided and tightened to secure the bearing in place. In the case of a rotating outer ring, and a non-rotating inner ring, the hub nut is tightened against the area of the non-rotating inner ring. However, even though the inner ring is designed to be non-rotating, there may be small micro-movements in the rotational direction which, if such movements reach the hub nut, can cause the hub nut to loosen. It is therefore customary to provide a lock washer between the hub nut and the inner ring. The lock washer is rotationally locked to the spindle or steering knuckle, and thereby prevents the micro-movements from the inner to be transmitted to the hub nut.

Although the above described standard wheel ends are well-established and fully functional, there is a constant endeavour in the technical field for improvements, such as improvements providing cost reductions. Thus, it would desirable to provide a wheel end assembly with reduced cost, without compromising the vehicle safety.

SUMMARY

An object of the invention is to provide a wheel end assembly and a vehicle which achieve a cost reduction compared to the prior art. This and other objects which will become apparent in the following are accomplished by a wheel end assembly and a vehicle as defined in the accompanying independent claims.

According to a first aspect of the invention, the object is achieved by a wheel end assembly for a vehicle, comprising:
- a central wheel support member such as a spindle or a steering knuckle,
- an outboard wheel end bearing arranged concentrically around the central wheel support member, the outboard wheel end bearing comprising roller elements accommodated between an inner race-forming part and an outer race-forming part surrounding the inner race-forming part, wherein the inner race-forming part is configured to be supported by the central wheel support member,
- wherein the central wheel support member comprises a first rotational lock portion,
- wherein the inner race-forming part comprises a second rotational lock portion configured to engage with the first rotational lock portion to prevent the inner race-forming part from rotating relative to the central wheel support member.

By the provision of an inner race-forming part which is rotationally locked to the central wheel support member (such as a spindle or a steering knuckle) the prior art lock washer may be omitted. Thus, by moving the rotational lock function from the prior art lock washer to the actual inner race-forming part, micro-movements in the rotational direction can be effectively avoided and thus the risk of a hub nut loosening due to such micro-movements of the inner race-forming part is greatly reduced. Since no separate component is needed to create the rotational locking function, there will be a reduced cost for producing the wheel end assembly and the vehicle. Additionally, because the lock washer can be omitted, the weight of the wheel end assembly may advantageously be reduced.

The inner race-forming part may be an inner ring of the outboard wheel end bearing or may include an inner ring of said bearing. Similarly, the outer race-forming part may be an outer ring of the outboard wheel end bearing or may include an outer ring of said bearing.

As mentioned above, the central wheel support member may be in the form of a spindle or a steering knuckle. A steering knuckle is normally provided at the front axle of the vehicle, while a spindle may be provided at the rear axle of the vehicle.

According to at least one exemplary embodiment, the wheel end assembly comprises a central geometrical axis, wherein the first rotational lock portion comprises a first substantially circular surface area encircling and facing radially away from the central geometrical axis, wherein the second rotational lock portion comprises a second substantially circular surface area encircling and facing radially towards the central geometrical axis, wherein each one of the first and second substantially circular surface areas is provided with one or more irregularities which locally interrupt the circularity of the substantially circular surface area. A circular interface between two components may normally allow for relative rotation. By providing one or more irregularities which locally interrupt the circularity, the relative rotation between the two components may be prevented in a simple and efficient way. For instance, such an irregularity may be a planar (flat) area portion, a protrusion, a recess, etc.

According to at least one exemplary embodiment, one of the first and second rotational lock portions comprises at least one protrusion, wherein the other one of the first and second rotational lock portions comprises at least one recess for mating with the at least one protrusion. Protrusions and recesses may be suitably shaped to engage each other in a satisfactory rotational lock. The protrusions and recesses may have any one of a variety of different locking shapes. The protrusions and recesses may suitably be curved in the circumferential direction around the central geometrical axis. For instance, they may form a concave or convex shape. A curved shape may reduce stress between the component. However, other shapes, such as polygonal, are also conceivable. Although it may suffice with one protrusion mating with one recess, it may be advantageous to have a plurality of mating protrusion/recess pairs, as it may increase the strength of the rotational locking. Suitably, if a plurality of mating protrusion/recess pairs are provided, such pairs may be equidistantly distributed around the wheel support member and inner race-forming part.

According to at least one exemplary embodiment, said at least one protrusion projects radially. Suitably, said at least one recess projects radially.

According to at least one exemplary embodiment, the first rotational lock portion comprises said at least one protrusion, wherein said at least one protrusion projects radially outwardly, wherein the second rotational lock portion comprises said at least one recess, wherein said at least one recess extends radially outwardly.

According to at least one exemplary embodiment, the second rotational lock portion comprises said at least one protrusion, wherein said at least one protrusion projects radially inwardly, wherein the first rotational lock portion comprises said at least one recess, wherein said at least one recess extends radially inwardly.

Each of the above protrusion/recess embodiments are advantageous in that the protrusions and recesses can be configured and designed to firmly engage with each other for obtaining a good rotational lock.

According to at least one exemplary embodiment, the first rotational lock portion comprises at least one flat surface portion, wherein the second rotational lock portion comprises a corresponding mating flat surface portion. An advantage of using a flat surface for rotational lock is that a flat surface can span over a relative large area portion, thus providing a strong rotational lock. While it may suffice with a single flat surface portion, on each one of the components, there may suitably be a plurality of equidistantly distributed components. In some exemplary embodiment, instead of having circular surface areas interrupted by irregularities, the surface area may be polygonal, such as hexagonal. Thus, in some exemplary embodiments the first rotational lock portion and the second rotational lock portion are formed by mating hexagonal surfaces forming a rotational lock. In other exemplary embodiments, each flat surface portion is located between curved surface portions. Thus, the first and second rotational lock portions may be formed by a respective substantially circular surface area, the circularity of which is locally interrupted by one or more flat surface portions.

According to at least one exemplary embodiment, the wheel end assembly further comprises a hub nut provided with inner threads engageable with outer threads of the central wheel support member, for threading the hub nut onto the central wheel support member. Because of the rotational locking of the inner race-forming part to the central wheel support member, the hub nut may be tightened without providing a lock washer in between the hub nut and the inner race-forming part. Thus, according to at least one exemplary embodiment, the hub nut is configured to be tightened so as to come into direct contact with the inner race-forming part.

According to at least one exemplary embodiment, the wheel end assembly comprises a wheel end hub configured to surround and to be supported by the outer race-forming part. The wheel end hub may be suitably configured to receive and hold a road wheel such that the rotation of the wheel axle is conveyed to the wheel end hub, whereby the vehicle on which the wheel assembly is provided can be caused to move in a forward or reverse direction.

According to a second aspect of the invention, the object is achieved by a vehicle comprising a wheel end assembly according to the first aspect, including any embodiments thereof.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
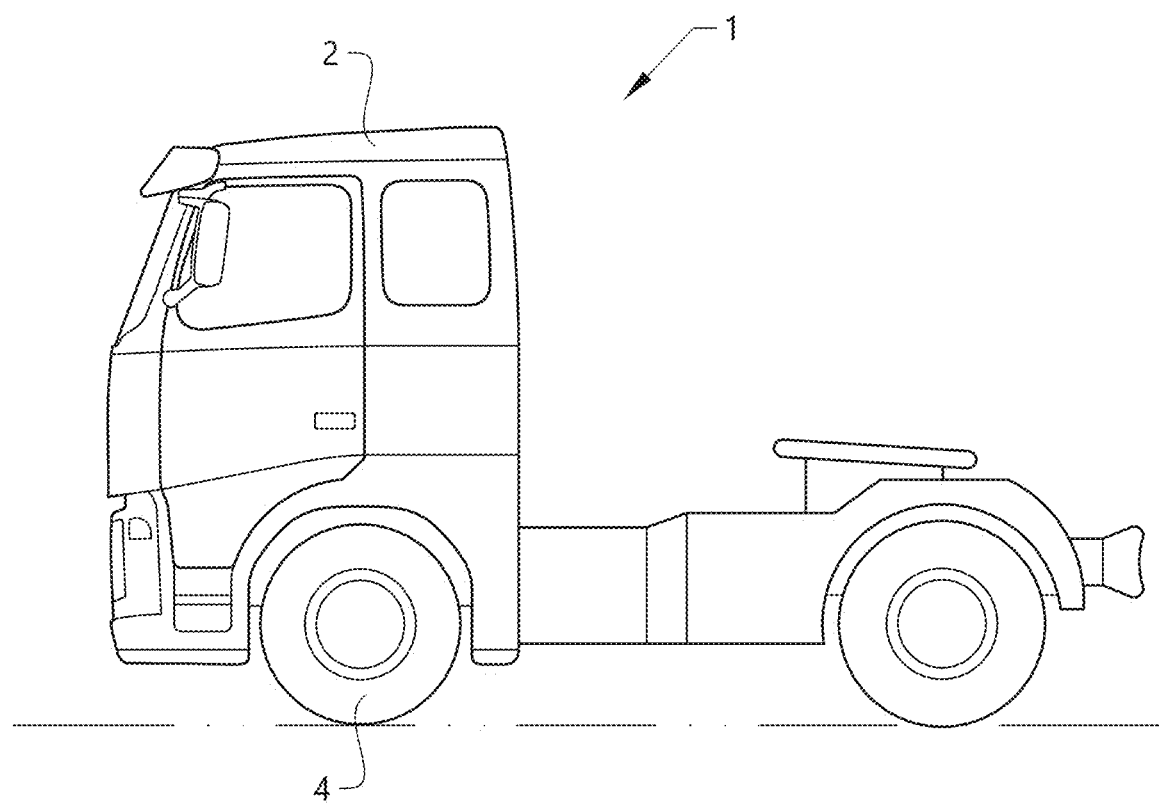
FIG. 1 illustrates a vehicle, in accordance with at least one exemplary embodiment of the invention.

FIG. 1 illustrates a vehicle 1, in accordance with at least one exemplary embodiment of the invention. Although the vehicle 1 is illustrated in the form of a truck, other types of vehicles, such as busses, construction equipment, trailers or passenger cars may be provided in accordance with the invention.

The truck (vehicle) comprises a cab 2 in which a driver may operate the vehicle 1. The vehicle 1 comprises a number of road wheels 4, herein illustrated as two pairs of wheels, however in other embodiments there may be a different number of wheels, such as three pairs, four pairs or more. The rotation of the wheels 4 is facilitated by means of wheel bearings (not shown in FIG. 1). The vehicle comprises 1 a wheel end assembly in which such a wheel bearing is included, which wheel end assembly will be further discussed in the following.

Figure 2:
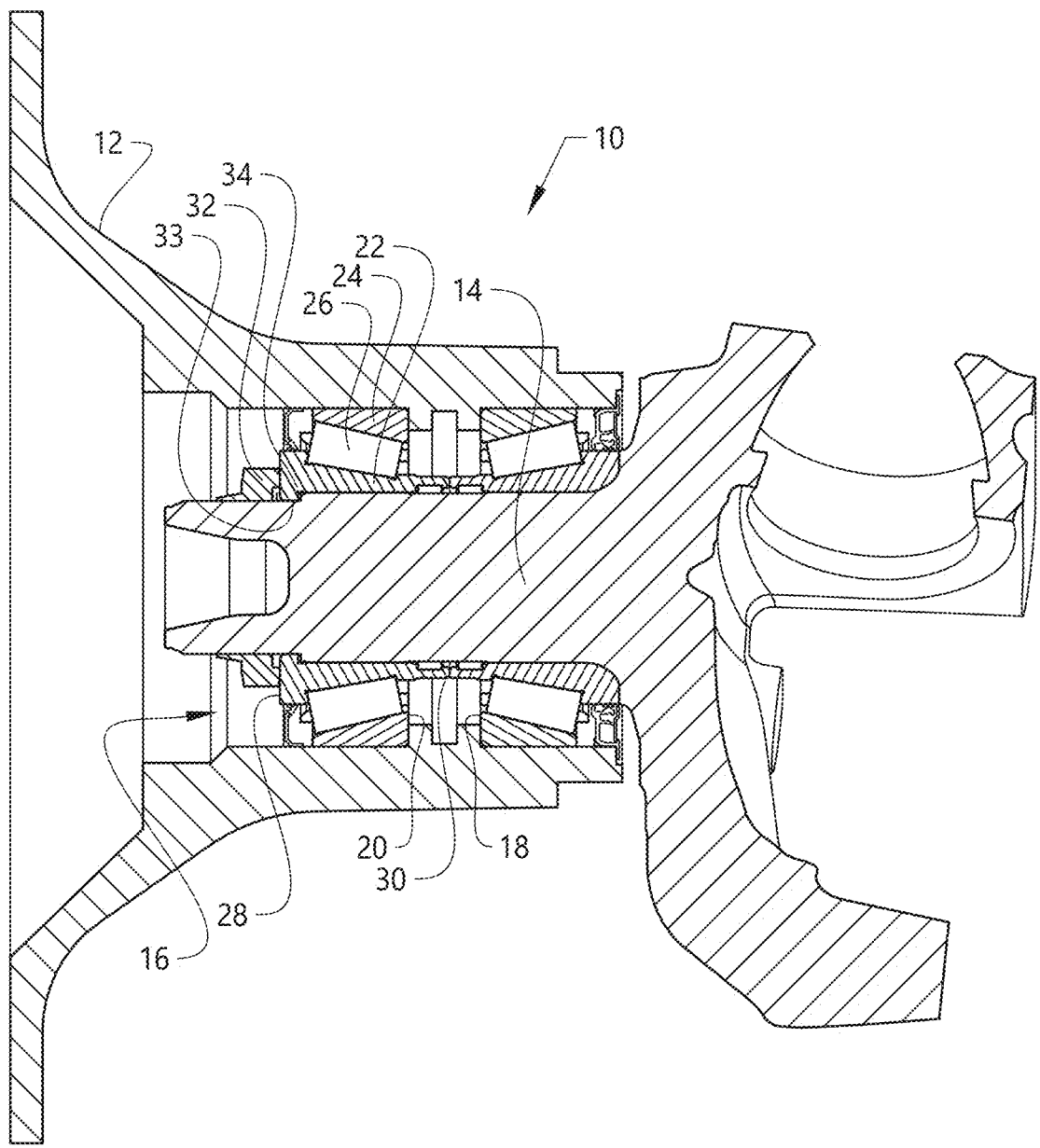
FIG. 2 illustrates a cross-section of a wheel end assembly, in accordance with at least one exemplary embodiment of the invention.

FIG. 2 illustrates a cross-section of a wheel end assembly 10, in accordance with at least one exemplary embodiment of the invention. A wheel end hub 12 is configured to receive and hold a road wheel (not illustrated in FIG. 2). The wheel end hub 12 is rotationally mounted to a central wheel support member 14 via a wheel bearing 16.

In FIG. 2 (and in the rest of the drawings of a central wheel support member) the central wheel support member 14 has been illustrated in the form of a steering knuckle, which may typically be provided at the front wheels of a vehicle. The knuckle is solid and used for non-driven wheels. However, it should be understood that the inventive principle could also be used for a wheel support member in the form of a hollow spindle. A hollow/tubular spindle may typically be provided at the rear wheels of a vehicle and is used in connection with driven wheels. Normally, a drive shaft or axle extends through the spindle and is fixed to the outside of the wheel end hub for propulsion of the wheel. The inventive principle is thus applicable to a central wheel support member irrespective of if it is in the form of a solid steering knuckle or in the form of a hollow spindle.

The wheel bearing 16 comprises an inboard wheel end bearing 18 and an outboard wheel end bearing 20, each of which is concentrically arranged around the central wheel support member 14. Of the two, it is the inboard wheel end bearing 18 which is configured to be located closest to a central longitudinal axis of the vehicle. Conversely, of the two, it is the outboard wheel end bearing 20 which is configured to be located furthest away from the central longitudinal axis of the vehicle.

The outboard wheel end bearing 20 comprises an inner-race forming part 22 and an outer race-forming part 24. The outboard wheel end bearing 20 also comprises roller elements 26 accommodated between the inner race-forming part 22 and the outer race-forming part 24. The roller elements 26 may suitably be circumferentially separated from each other by a cage having individual holes for each roller element. The relative motions of the inner and outer race-forming parts 22, 24 causes the roller elements 26 to roll with very little rolling resistance. The inner race-forming part 22 may also be referred to as an inner ring and the outer race-forming part 24 may also be referred to as an outer ring. In a similar way, the inboard wheel end bearing 18 comprises roller elements accommodated between an inner race-forming part and an outer race-forming part.

The outboard wheel end bearing 20 has an outboard periphery 28 intended to face away from the central longitudinal axis of the vehicle and an inboard periphery 30 intended to face towards the central longitudinal axis of the vehicle.

A hub nut 32, which comprises an inner threading is mounted to the central wheel support member 14, which has corresponding outer threading, allowing the hub nut 32 to be threaded onto the central wheel support member 14. The hub nut 32 is tightened to come in direct contact with the inner race-forming part 22, in particular with the outboard periphery 28 of the inner race-forming part 22.

In its turn, the inner race-forming part 22 of the outboard wheel end bearing 20 (and similarly the inner race-forming part of the inboard wheel end bearing 18) is mounted to the central wheel support member 14. The central wheel support member 14 (irrespective of being in the form of the shown steering knuckle or in the form of a hollow spindle receiving a drive shaft) is configured to be non-rotating. Similarly, the connected inner race-forming part 22 is configured to be non-rotating. The wheel end hub 12 and the outer race-forming part 24 connected to the wheel end hub 12 are rotating when the wheel is rotating. Even though the inner race-forming part 22 is configured to be non-rotating, small micro-movements may occur. Historically, you would provide a lock washer between the inner race-forming part 22 and the hub nut 32 to avoid the risk of such micro-movements reaching the hub nut 32 and causing loosening of the hub nut 32. In the different embodiments of the invention, however, such a lock washer may be omitted. Instead, there is provided a rotational locking between the inner race-forming part 22 and the central wheel support member 14, preventing the inner race-forming part 22 from rotating relative to the central wheel support member 14. As better seen in FIG. 4 (which illustrates the wheel end assembly in FIGS. 2 and 3, with the wheel bearing 16 separated from the central wheel support member 14), the rotational locking is accomplished by means of a first rotational lock portion 33 comprised in the central wheel support member 14 and a second rotational lock portion 34 comprised in the inner race-forming part 22. The first rotational lock portion 33 and the second rotational lock portion are dimensioned 34 and configured to engage and interlock with each other so as to accomplish said prevention against relative rotational movement. It should be understood that the first and the second rotational lock portions 33, 34 form a mechanical rotational locking.

Figure 3:
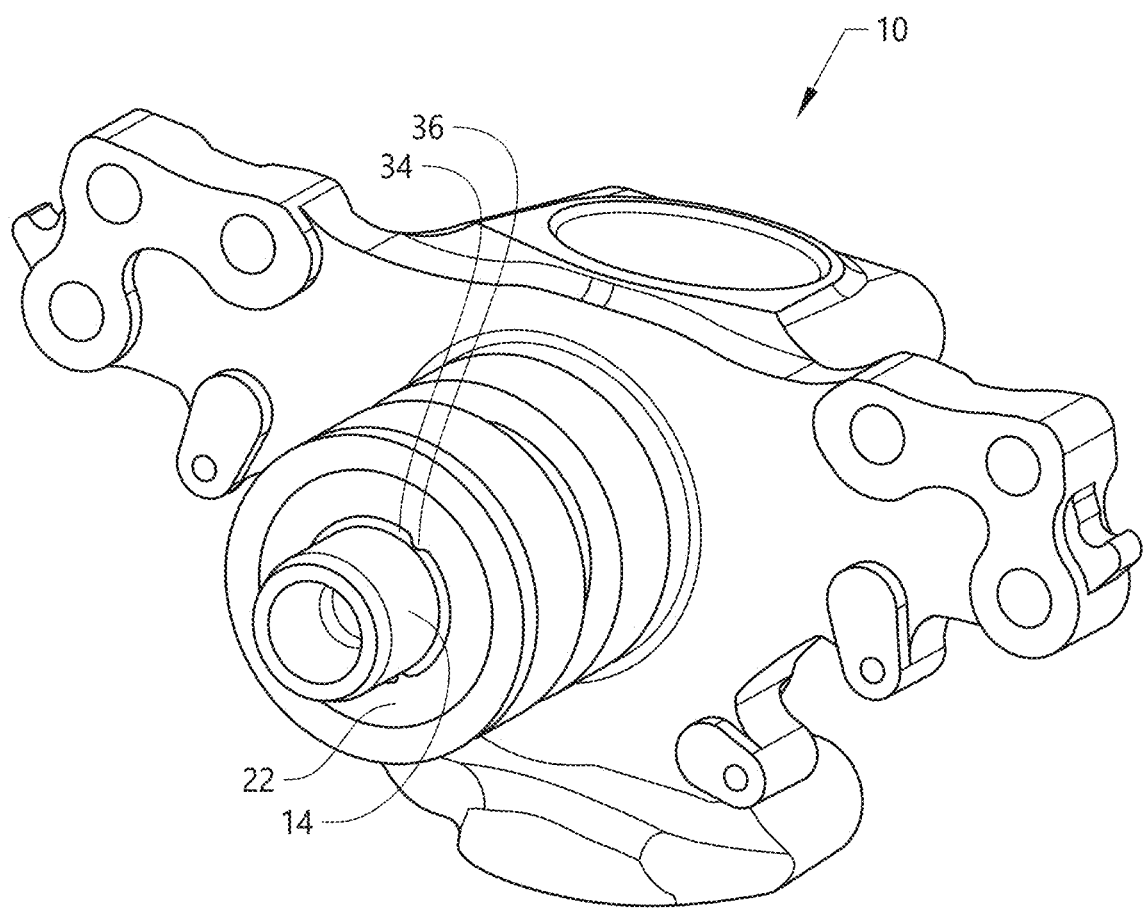
FIG. 3 illustrates a perspective view of the wheel end assembly in FIG. 2.

The second rotational lock portion 34 is also visible in FIG. 3, which illustrates a perspective view of the wheel end assembly 10 in FIG. 2.

Figure 4:
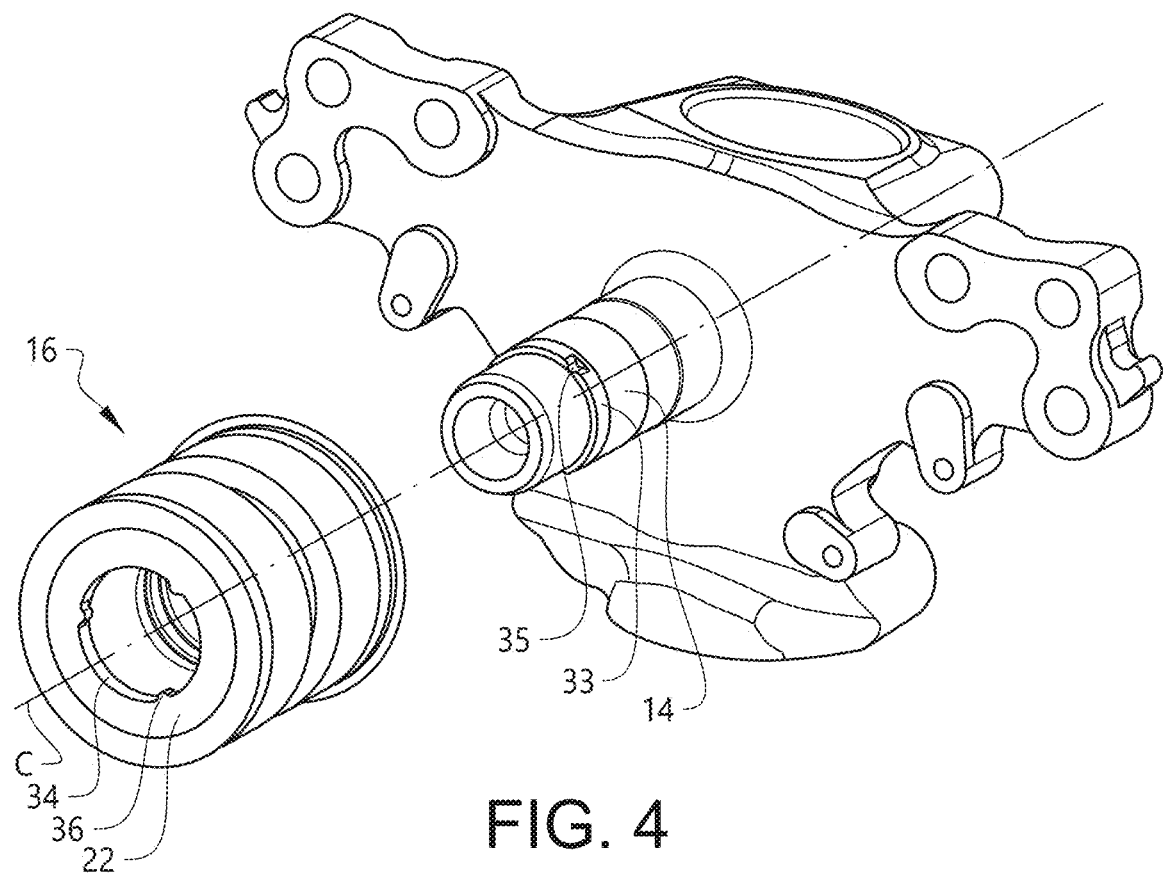
FIG. 4 illustrates the wheel end assembly in FIG. 3, with the wheel bearing separated from the central wheel support member.
Figure 5:
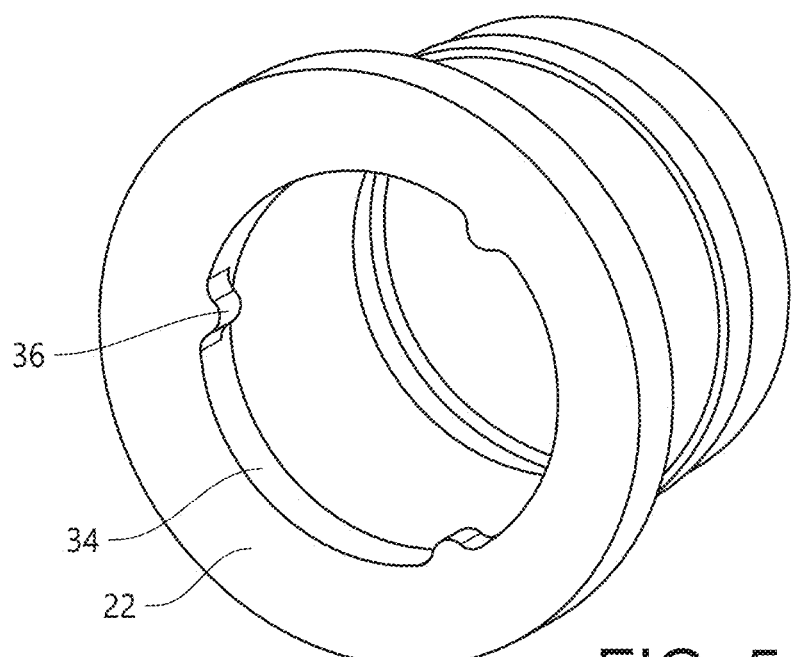
FIG. 5 illustrates an inner race-forming part which is included in the outboard wheel end bearing illustrated in FIG. 4.

The second rotational lock portion 34 is also visible in FIG. 5, which illustrates an inner race-forming part 22 which is included in the outboard wheel end bearing of the wheel bearing 16 illustrated in FIG. 4.

As can be seen in FIG. 4, the wheel end assembly comprises a central geometrical axis C. The central geometrical axis C corresponds to the geometric rotational axis of the road wheel when operatively connected to the wheel end hub (not shown in FIG. 4). The first rotational lock portion 33 comprises a first substantially circular surface area encircling and facing radially away from the central geometrical axis C. The second rotation lock portion 34 comprises a second substantially circular surface area encircling and facing radially towards the central geometrical axis C. Each one of the first and second substantially circular surface areas is provided with one or more irregularities. The irregularities may be in the form of recesses 35 and protrusions 36 as shown in FIG. 4 or may be in the form of flat surfaces as will be discussed later in connection with at least another exemplary embodiment in FIGS. 7-11.

In the case of irregularities being in the form of protrusions 36 and recesses 35, one of the first and second rotational lock portions 33, 34 may comprise at least one protrusion 36, while the other one of the first and second rotational lock portions 33,34 may comprises at least one recess 35 for mating with the at least one protrusion 36. In either case the at least one protrusion 36 and the at least one recess 35 may suitably project radially.

In the exemplary embodiment of FIGS. 2-6, the second rotational lock portion 34 comprises said at least one protrusion 36, wherein said at least one protrusion 36 projects radially inwardly (from the rest of the inner race-forming part 22) towards the central geometrical axis C, wherein the first rotational lock portion 33 comprises said at least one recess 35, wherein said at least one recess extends radially inwardly (from the rest of the central wheel support member 14). In the illustrated exemplary embodiment there are provided three protrusions 36 and three mating recesses 35 for rotationally locking the inner race-forming part 22 to the central wheel support member 14. The three protrusions 36 are equidistantly distributed around the central geometrical axis C. In other words a centre point of each protrusion 36 is separated from a centre point of a neighbouring protrusion 36 by approximately 120°. The recesses 35 have been correspondingly distributed around the central geometrical axis C. Although three protrusions 36 and three recesses 35 have been illustrated in this exemplary embodiment, it should be understood that the number of protrusion/recess pairs may be fewer or more than the illustrated three pairs. For instance, the number of protrusion/recess pairs may be one, two, four or more.

Figure 6:
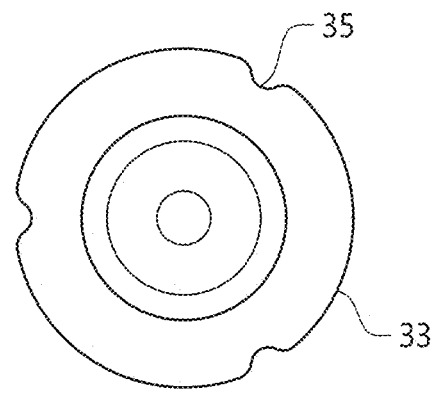
FIG. 6 schematically illustrates the configuration of the first and second rotational lock portions of the wheel end assembly illustrated in FIGS. 2-5.
Figure 6:
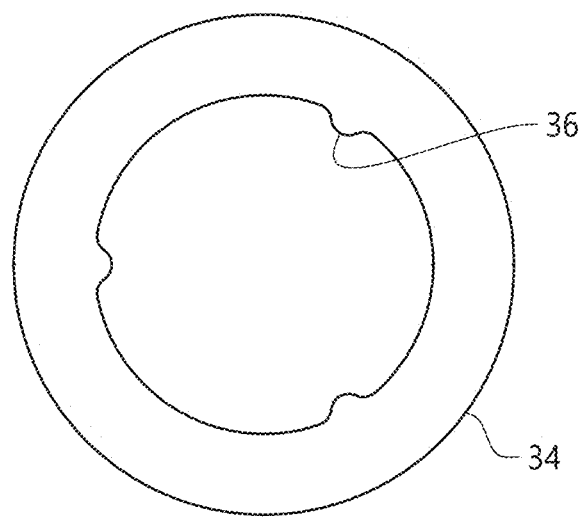
Figure 7:
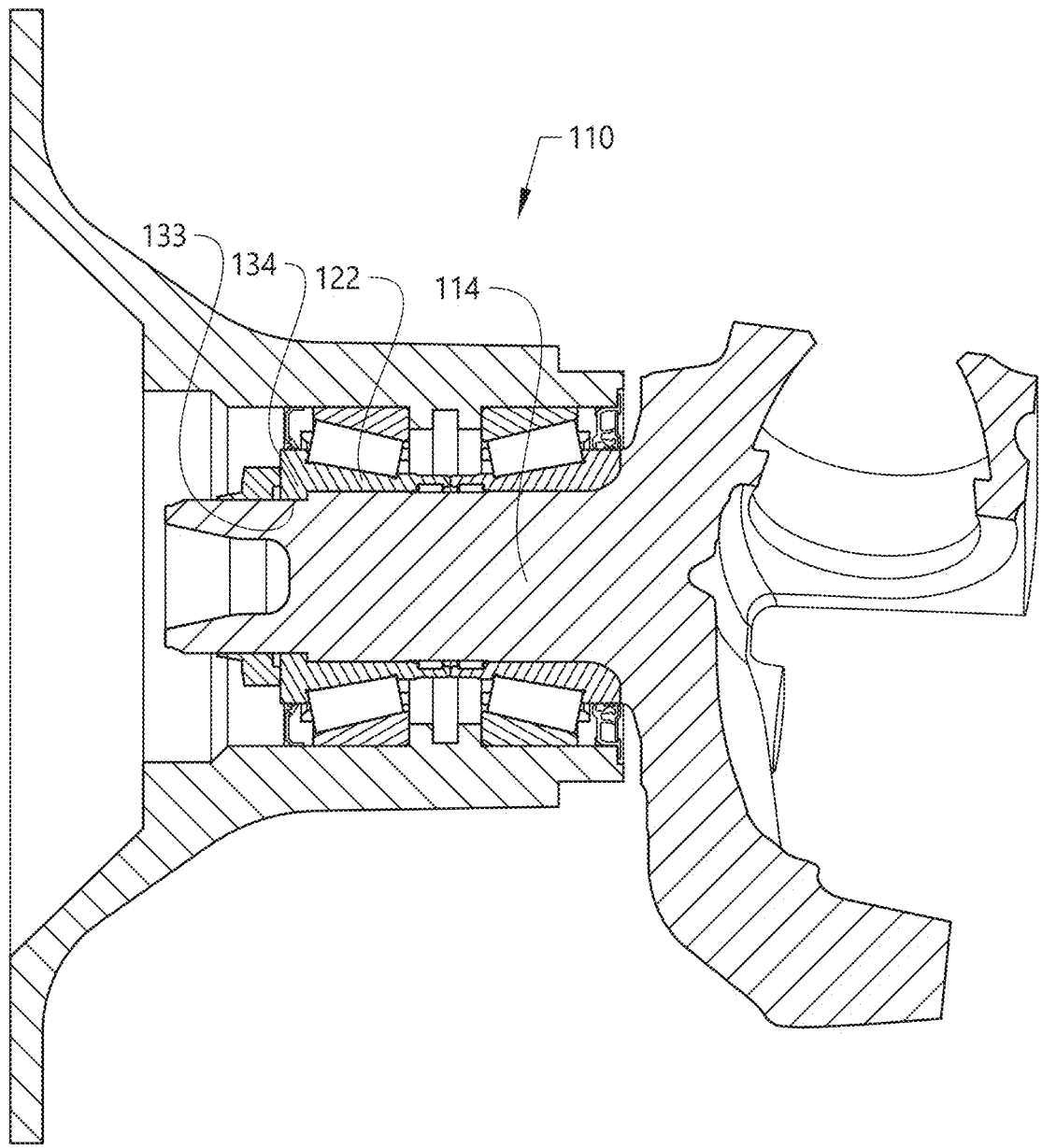
FIG. 7 illustrates a cross-section of a wheel end assembly, in accordance with at least a second exemplary embodiment of the invention.
Figure 8:
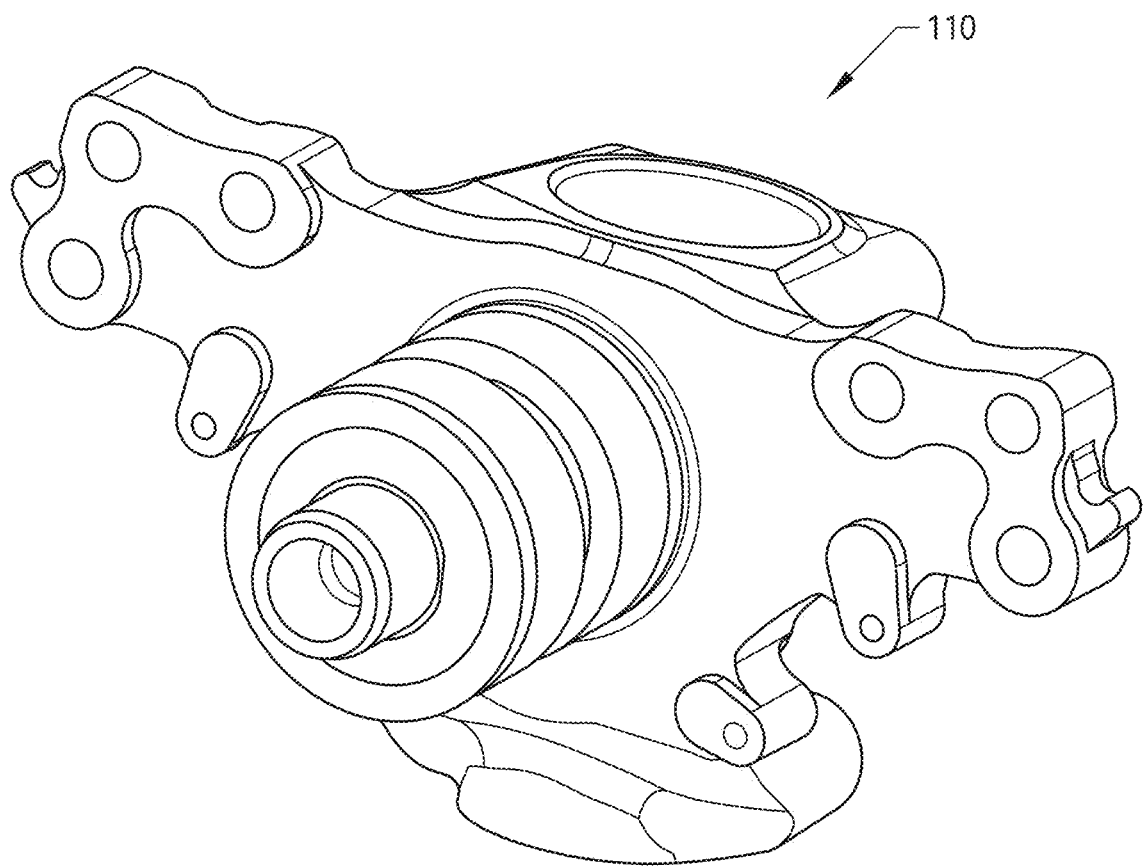
FIG. 8 illustrates a perspective view of the wheel end assembly in FIG. 7.

FIG. 5 illustrates the inner race-forming part 22 which is included in the outboard wheel end bearing of the separated wheel bearing 16 illustrated in FIG. 4. FIG. 6 schematically illustrates the configurations of the first and second rotational lock portions 33, 34 of the wheel end assembly illustrated in FIGS. 2-5. As can be seen in FIGS. 5 and 6, the protrusions 36 and the recesses 35 may suitably be curved or arched in the circumferential direction. Each protrusions 36 may thus form a convex element which fits in a corresponding concave element formed by a respective one of the recesses 35.

It should be noted that in other exemplary embodiments, the protrusions and recesses do not necessarily have to be irregularities on substantially circular surface areas. They could be irregularities from any surface area. Thus, in a general sense, in accordance with at least one exemplary embodiment, one of said first and second rotational lock portions comprise at least one protrusion, wherein the other one of the first and second lock portions comprises at least one recess for mating with the at least one protrusion (irrespective of there being a substantially circular surface area or not).

FIGS. 7-11 illustrate a wheel end assembly 110, or parts thereof, in accordance with at least a second exemplary embodiment of the invention. Most features of the wheel end assembly 110 correspond to that shown in the previously discussed exemplary embodiment of FIGS. 2-6. However, the rotational lock is different. In the exemplary embodiment of FIGS. 7-11, the rotational lock comprises mating flat portions 140, 142 instead of protrusions 36 mating with recesses 35.

Figure 9:
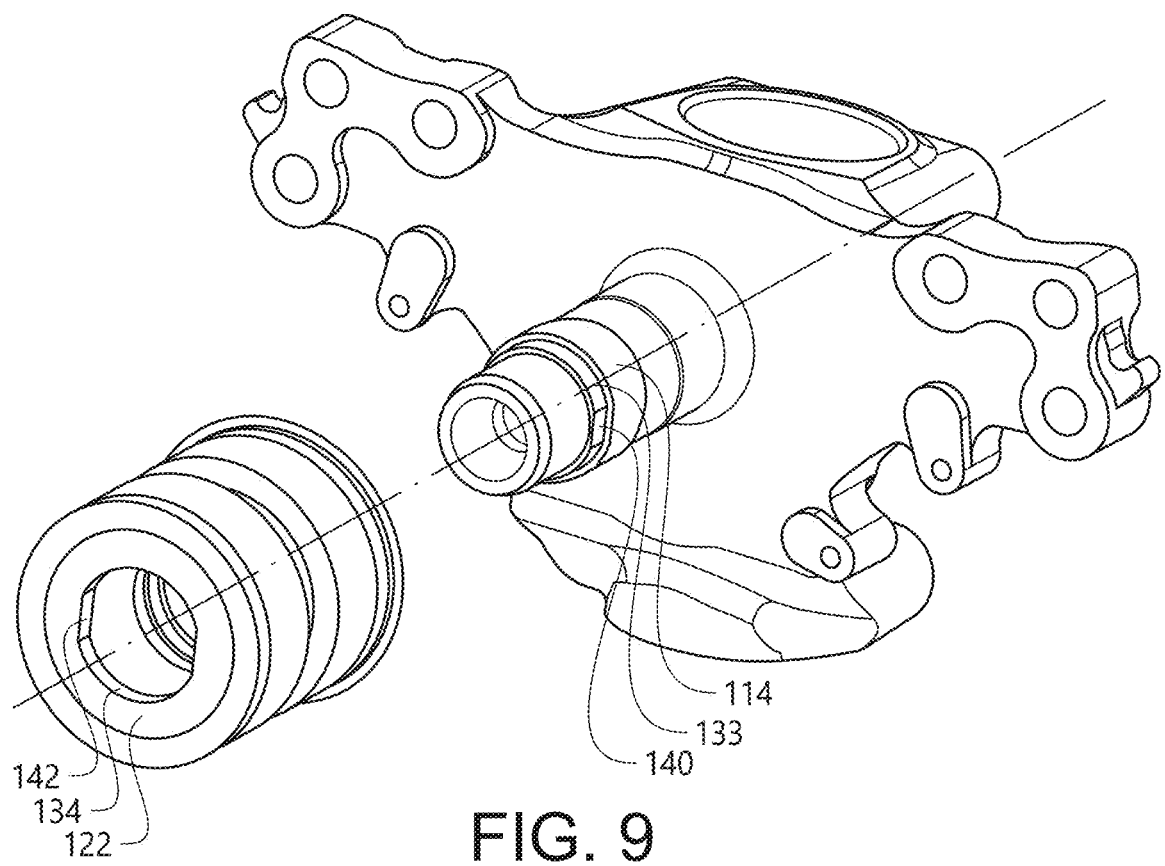
FIG. 9 illustrates the wheel end assembly in FIG. 8, with the outboard wheel end bearing separated from the central wheel support member.
Figure 10:
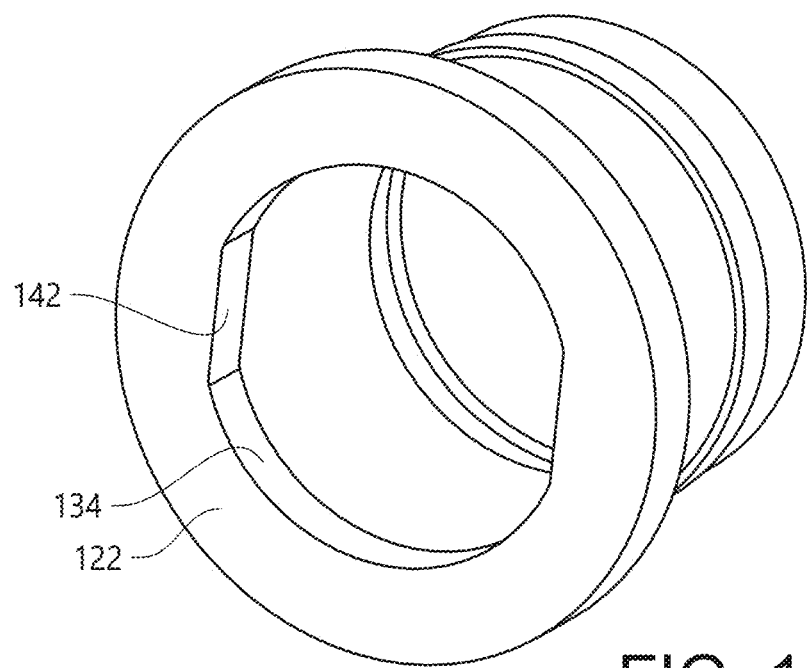
FIG. 10 illustrates an inner race-forming part which is included in the outboard wheel end bearing illustrated in FIG. 9.
Figure 11:
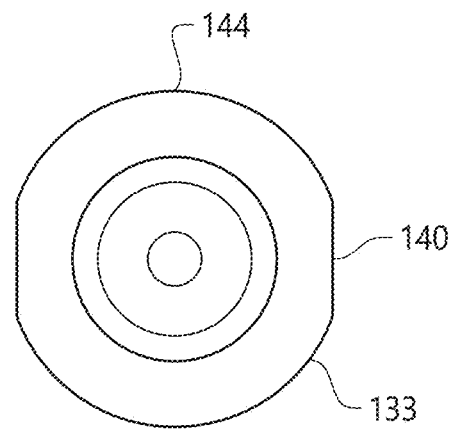
FIG. 11 schematically illustrates the configuration of the first and second rotational lock portions of the wheel end assembly illustrated in FIGS. 7-10.
Figure 11:
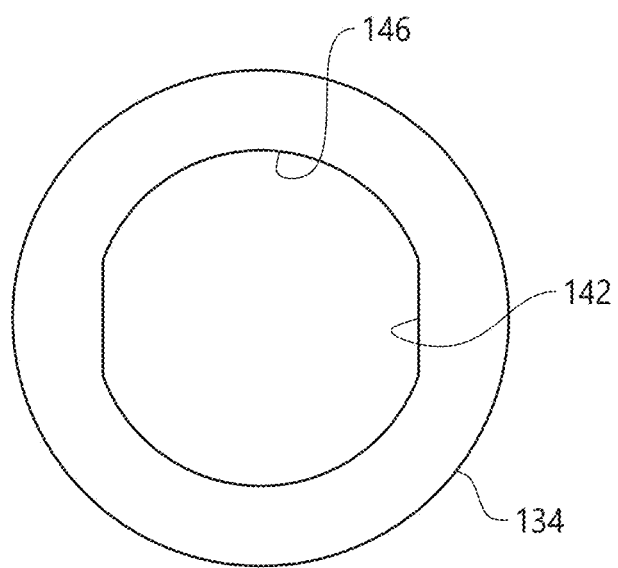

As best seen in FIGS. 9-11, the first rotational lock portion 133 (i.e. at the central wheel support member 114) comprises at least one flat surface portion 140, wherein the second rotational lock portion 134 (i.e. at the inner race-forming part 122) comprises a corresponding mating second flat surface portion 142. As can be seen in these figures, each flat surface portion 140, 142 is located between curved surface portions 144, 146 which form the outline of a generally circular surface area encircling the central geometrical axis, wherein the circularity of the generally circular surface area is locally interrupted by the flat surface portions 140, 142.

In the illustrated exemplary embodiment, two flat surface portions are illustrated for each one of the first and second rotational lock portions 133, 134. The two flat surface portions are located on opposite sides (i.e. at 180° relative each other) of their corresponding lock portion. However, it should be understood that the number of flat surface portion pairs may be different then the illustrated two pairs. Thus, the number may be fewer of larger than the illustrated two pairs. For instance, the rotational locking may be achieved by one flat surface portion pair or by three, four or more pairs. Furthermore, the length of each flat surface portion may be different than what is illustrated in the figures. Thus, the flat surface portions 140, 142 may be shorter or longer than illustrated. Furthermore, in some exemplary embodiments, there may be no curved portions between the flat surface portions. For instance, in some exemplary embodiments, the first and second rotational lock portions may be in the form of matching polygons (such as square, pentagon, hexagon, etc.) instead of a substantially circular surface area provided with irregularities.

Figure 12:
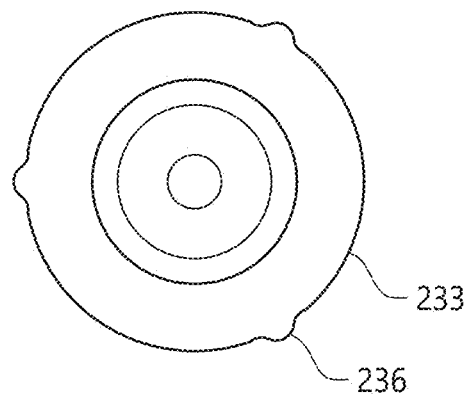
FIG. 12 schematically illustrates a configuration of the first and second rotational lock portions of a wheel end assembly, in accordance with a third exemplary embodiment.
Figure 12:
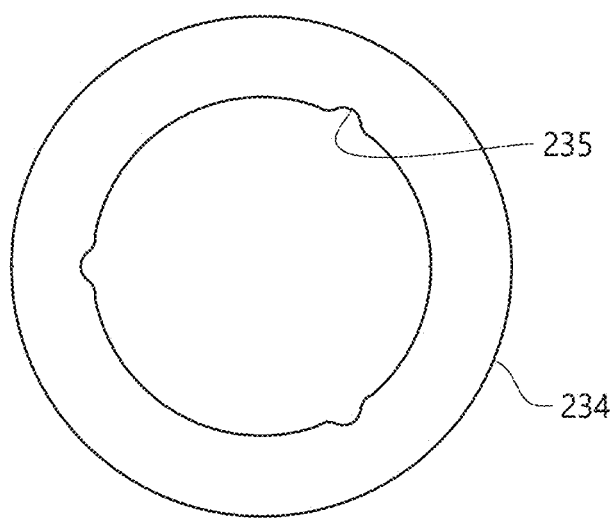

FIG. 12 schematically illustrates a configuration of the first rotational lock portion 233 and second rotational lock portion 234 of a wheel end assembly, in accordance with a third exemplary embodiment. This exemplary embodiment is included to demonstrate that the protrusions 236 and recesses 235 can be the other way around compared to the exemplary embodiment of FIGS. 2-6. Thus, as shown in FIG. 12, in at least some exemplary embodiments, the first rotational lock portion 233 comprises at least one protrusion 236 (for example three as illustrated, or fewer, or more), wherein said at least one protrusion 236 projects radially outwardly (away from the central geometrical axis), wherein the second rotational lock portion 234 comprises at least one recess 235 (for example three as illustrated, or fewer, or more), wherein said at least one recess 235 extends radially outwardly.

In other exemplary embodiments, the first rotational lock portion may have a combination of at least one protrusion and at least one recess, and the second rotational lock portion may have a combination of at least one recess for mating the protrusion of the first rotational lock portion, and at least one protrusion for mating the recess of the first rotational lock portion.

It is to be understood that the present invention is not limited to the embodiments described above and illustrated in the drawings; rather, the skilled person will recognize that many changes and modifications may be made within the scope of the appended claims.

The invention claimed is:
1. A wheel end assembly for a vehicle, comprising:
a central wheel support member; and
an outboard wheel end bearing arranged concentrically around the central wheel support member, the outboard wheel end bearing comprising roller elements accommodated between an inner race-forming part and an outer race-forming part surrounding the inner race-forming part, wherein the inner race-forming part is configured to be supported by the central wheel support member;
wherein the central wheel support member comprises a first rotational lock portion;
wherein the inner race-forming part comprises a second rotational lock portion configured to engage with the first rotational lock portion to prevent the inner race-forming part from rotating relative to the central wheel support member;

wherein one of the first and second rotational lock portions comprises at least one protrusion, wherein the other one of the first and second rotational lock portions comprises at least one recess for mating with the at least one protrusion; and wherein the first rotational lock portion comprises at least one flat surface portion, wherein the second rotational lock portion comprises a corresponding mating flat surface portion.

2. The wheel end assembly of claim 1, comprising a central geometrical axis, wherein the first rotational lock portion comprises a first substantially circular surface area encircling and facing radially away from the central geometrical axis, wherein the second rotational lock portion comprises a second substantially circular surface area encircling and facing radially towards the central geometrical axis, wherein each one of the first and second substantially circular surface areas is provided with one or more irregularities which locally interrupt the circularity of the substantially circular surface area.

3. The wheel end assembly of claim 1, wherein the at least one protrusion projects radially.

4. The wheel end assembly of claim 3, wherein the first rotational lock portion comprises the at least one protrusion, wherein the at least one protrusion projects radially outwardly, wherein the second rotational lock portion comprises the at least one recess, wherein the at least one recess extends radially outwardly.

5. The wheel end assembly of claim 3, wherein the second rotational lock portion comprises the at least one protrusion, wherein the at least one protrusion projects radially inwardly, wherein the first rotational lock portion comprises the at least one recess, wherein the at least one recess extends radially inwardly.

6. The wheel end assembly of claim 1, wherein each flat surface portion is located between curved surface portions.

7. The wheel end assembly of claim 1, further comprising a hub nut provided with inner threads engageable with outer threads of the central wheel support member, for threading the hub nut onto the central wheel support member.

8. The wheel end assembly of claim 7, wherein the hub nut is configured to be tightened so as to come into direct contact with the inner race-forming part.

9. The wheel end assembly of claim 1, comprising a wheel end hub configured to surround and to be supported by the outer race-forming part.

10. A vehicle comprising the wheel end assembly of claim 1.

* * * * *